Patented Jan. 8, 1935

1,987,208

UNITED STATES PATENT OFFICE 1,987,208

OXIDATION OF ORGANIC COMPOUNDS OF HIGH MOLECULAR WEIGHT

Ernst Peukert, Neuroessen, Germany, assignor to I. G. Farbenindustrie Aktiengesellschaft, Frankfort-on-the-Main, Germany, a corporation of Germany No Drawing. Application August 19, 1929, Serial No. 387,087. In Germany September 7, 1928

5 Claims. (Cl. 260—116)

The present invention relates to the oxidation of organic compounds of high molecular weight.

When energetic conditions are employed in the oxidation of paraffin hydrocarbons of high molecular weight, such as paraffin waxes, by means of gaseous oxidizing agents in order to obtain products of a high stage of oxidation, such as acids, dark colored and resinified substances are also obtained as by products.

I have now found that the initial materials can be completely oxidized without the formation of the by products already described, by continuously withdrawing the oxidation products from the reaction mixture after only a partial oxidation, and by then again subjecting the non-oxidized portion to oxidation while continuously adding fresh initial material, and so on. The withdrawal of the oxidation products from the reaction mixture drawn off can be effected in any suitable manner, by sweating, pressing, centrifuging, saponifying or extracting for example by treatment with a suitable solvent in which the oxidized portion of the initial materials will dissolve whilst the non-oxidized or only slightly oxidized portion remains undissolved. In this manner it is possible to convert the whole of the initial materials into light-colored products of a practically uniformly high stage of oxidation in contrast to any expectation which result cannot be obtained by a discontinuous process without considerable difficulties and series of different operations. For the purpose already described the following solvents for example are suitable, alcohols, pyridine, acetone and homologues of the same, and in many cases a small content of water in these solvents is of advantage. The employment of methyl alcohol or mixtures containing the same as solvents is particularly suitable.

The oxidizing process in accordance with the present invention is carried out usually between about 120° to 170° C. and only so far that practically no colored products are formed, and that a portion of the oxidized products is continuously removed from the reaction chamber and the equivalent quantity of initial material is introduced. The velocity of introduction and removal can be easily regulated so that a product having the desired invariable nature, that is to say free from colored constituents, is continuously obtained. The process in accordance with the present invention is based on the surprising fact that by maintaining a definite degree of oxidation, for example by avoiding an increase of the acid value of the reaction mixture above a certain degree, say about 50, which may vary according to the working conditions, such as temperature, catalysts or stabilizers and the like, such as alkaline earth metal salts of organic acids, for example barium cinnamate, or enolates of these or other metals, for example manganese acetylacetonate, the primary oxidation products which are sensitive to further oxidation can be exposed without danger to a prolonged oxidizing treatment, to which they are naturally subjected in the continuous oxidation of a portion of the reaction mixture. By the manner of working already described dark colored secondary oxidation products or resinous bodies are neither formed directly, nor after saponification of the oxidation products with alkali.

The following examples will further illustrate the nature of the said invention but the invention is not restricted to these examples.

Example 1

Paraffin wax in a reaction vessel provided with an inlet near its bottom and an upper overflow is oxidized by means of air with a velocity of flow of 1 cubic metre of air per hour and per kilogram of the wax, at 140° centigrade until the acid value is 50. Then, a portion of the reaction product is continuously removed and fresh paraffin wax continuously added in such a manner that the mass during the oxidation maintains the acid value of 50 practically continuously. The effluent reaction product is subjected to a pressing process by which the oxidized fraction is separated from the non-oxidized material, and the latter is then again led back for oxidation. The oxidation product obtained is colorless and does not become colored when saponified.

Example 2

An oxidation product of paraffin wax, such as is obtained for example after blowing with air for 2 hours at about 150° centigrade in a vessel filled with Raschig rings to above the level of the molten wax is treated with 10 times the quantity of methyl alcohol in the cold, and the solution filtered from undissolved matter. The residue remaining after evaporation of the methyl alcoholic solution amounts to about 50 per cent of the initial material, and has a saponification value of over 200. The residue which was insoluble in methyl alcohol is mixed with fresh paraffin wax, the mixture is then oxidized, and, after the oxidation, is again treated with methyl alcohol in the manner already described and so on.

*Example 3*

A partially oxidized paraffin wax obtained in the manner described in Example 1 is extracted with 10 times the quantity of pyridine containing from 5 to 10 per cent of water, and in this manner about 68 per cent of the initial material goes into solution. The residue is mixed with fresh paraffin wax and again oxidized. The extracted product is oily and has a saponification value of 220.

The oxidation product can be isolated continuously also by sweating out at about from 35° to 40° centigrade.

What I claim is:—

1. The continuous oxidation of paraffin hydrocarbons of high molecular weight by means of a gaseous oxidizing agent which comprises blowing a gaseous oxidizing agent through the said paraffin hydrocarbons in the molten state, while initially warming and continuously drawing off part of the reaction product and adding fresh initial material as soon as the acid value of the reaction product is about 50.

2. The continuous oxidation of paraffin hydrocarbons of high molecular weight by means of a gaseous oxidizing agent which comprises blowing a gaseous oxidizing agent through paraffin wax in the molten state, while initially warming and continuously drawing off part of the reaction product and adding fresh initial material as soon as the acid value of the reaction product is about 50.

3. The continuous oxidation of paraffin hydrocarbons of high molecular weight by means of a gaseous oxidizing agent which comprises blowing an oxidizing gas through paraffin wax in the molten state, continuously drawing off the resulting oxidized products when the acid value of the said molten wax is about 50, separating any unoxidized product from said withdrawn oxidized products, and feeding said separated unoxidized product into the said remaining molten paraffin wax together with fresh initial material.

4. The continuous oxidation of paraffin hydrocarbons of high molecular weight by means of a gaseous oxidizing agent which comprises blowing an oxidized gas through paraffin wax in the molten state, at a temperature of from 120° to 170° C., in the presence of a catalyst, continuously drawing off the resulting oxidized products when the acid value of the said molten wax is about 50, separating any unoxidized product from said withdrawn oxidized products, and feeding said separated unoxidized product into the said remaining molten paraffin wax together with fresh initial material.

5. The continuous oxidation of paraffin hydrocarbons of high molecular weight by means of a gaseous oxidizing agent which comprises blowing an oxidizing gas through paraffin wax in the molten state, continuously drawing off the resulting oxidized products when the acid value of the said molten wax is about 50, treating said withdrawn products with pyridine to separate the oxidized products from the unoxidized product, and feeding said separated unoxidized product into the said remaining molten paraffin wax together with fresh initial material.

ERNST PEUKERT.